United States Patent
Singh et al.

(10) Patent No.: US 9,635,589 B2
(45) Date of Patent: Apr. 25, 2017

(54) SEAMLESS SESSION MOBILITY ON A WIRELESS COMMUNICATION DEVICE HAVING MULTIPLE RADIO INTERFACES

(71) Applicant: Apple Inc., Cupertino, CA (US)

(72) Inventors: Ajoy K. Singh, Milpitas, CA (US); Wen Zhao, San Jose, CA (US); Najeeb Abdulrahiman, Fremont, CA (US)

(73) Assignee: Apple Inc., Cupertino, CA (US)

( * ) Notice: Subject to any disclaimer, the term of this patent is extended or adjusted under 35 U.S.C. 154(b) by 320 days.

(21) Appl. No.: 14/224,893

(22) Filed: Mar. 25, 2014

(65) Prior Publication Data

US 2014/0293959 A1   Oct. 2, 2014

Related U.S. Application Data

(60) Provisional application No. 61/805,484, filed on Mar. 26, 2013.

(51) Int. Cl.

| | |
|---|---|
| *H04L 12/715* | (2013.01) |
| *H04W 36/12* | (2009.01) |
| *H04W 36/00* | (2009.01) |
| *H04W 80/10* | (2009.01) |
| *H04W 36/14* | (2009.01) |
| *H04W 40/02* | (2009.01) |

(52) U.S. Cl.
CPC ....... *H04W 36/0016* (2013.01); *H04W 80/10* (2013.01); *H04W 36/14* (2013.01); *H04W 40/02* (2013.01)

(58) Field of Classification Search
CPC . H04W 36/0016; H04W 80/10; H04W 36/14; H04W 40/02

USPC ........................................................ 370/331
See application file for complete search history.

(56) References Cited

U.S. PATENT DOCUMENTS

| 8,477,785 | B2 * | 7/2013 | Kant ................. | H04W 36/0022 |
| | | | | 370/338 |
| 8,978,056 | B2 * | 3/2015 | Albal ................. | H04N 21/4331 |
| | | | | 348/14.08 |
| 2006/0028998 | A1 * | 2/2006 | Lioy ..................... | H04L 69/167 |
| | | | | 370/252 |
| 2009/0201879 | A1 * | 8/2009 | Purkayastha ..... | H04W 36/0011 |
| | | | | 370/331 |
| 2010/0008291 | A1 * | 1/2010 | LeBlanc ................. | H04L 45/24 |
| | | | | 370/328 |

(Continued)

OTHER PUBLICATIONS

Perkins, "IP Mobility Support for IPv4", RFC 3220, Jan. 2002.
Johnson et al., "Mobility Support in IPv6", RFC 3775, Jun. 2004.

*Primary Examiner* — Melvin Marcelo
(74) *Attorney, Agent, or Firm* — Downey Brand LLP

(57) ABSTRACT

A method for seamless session mobility on wireless communication device including a first physical interface and a second physical interface is provided. The method can include a wireless communication device anchoring a data session for an application to a logical interface associated with the first physical interface. The method can further include the wireless communication device routing data for the data session sent to the logical interface by the application to the second physical interface for transmission via the second physical interface in an instance in which the wireless communication device has an active connection to a radio access network via the second physical interface.

20 Claims, 9 Drawing Sheets

(56) References Cited

U.S. PATENT DOCUMENTS

| | | | | |
|---|---|---|---|---|
| 2011/0007705 A1* | 1/2011 | Buddhikot | ............. | H04L 63/02 |
| | | | | 370/331 |
| 2011/0319086 A1* | 12/2011 | Katori | ................... | H04W 48/08 |
| | | | | 455/440 |
| 2012/0052857 A1* | 3/2012 | Kumar | .................. | H04W 24/08 |
| | | | | 455/424 |
| 2012/0063428 A1* | 3/2012 | Ng | .................... | H04W 36/0016 |
| | | | | 370/338 |
| 2012/0143939 A1* | 6/2012 | Kang | ...................... | H04W 8/26 |
| | | | | 709/201 |
| 2013/0079048 A1* | 3/2013 | Cai | ....................... | H04W 48/16 |
| | | | | 455/517 |

* cited by examiner

SEAMLESS SESSION MOBILITY ON A WIRELESS COMMUNICATION DEVICE HAVING MULTIPLE RADIO INTERFACES

CROSS-REFERENCE TO RELATED APPLICATION

This application claims the benefit of priority from U.S. Provisional Patent Application No. 61/805,484, filed on Mar. 26, 2013, which is hereby incorporated herein by reference in its entity.

FIELD

The described embodiments relate generally to wireless communications technology. More particularly, the present embodiments relate to seamless session mobility on a wireless communication device having multiple radio interfaces.

BACKGROUND

Many modern wireless communication devices are multi-mode devices, or multi-radio devices, which include multiple radio interfaces that enable the device to support communication via multiple radio access technologies (RATs). Such multi-mode devices support a variety of applications that can rely on network communication to support application functionality. The presence of multiple radio interfaces on a device can thus require the device to implement a mobility solution to handover applications from one interface to another without impacting end-to-end performance of an application. Various solutions have been proposed to address Internet Protocol (IP) layer session continuity. These solutions can be categorized as application layer mobility solutions, such as session initiation protocol (SIP); transport layer mobility solutions, such as stream control transmission protocol (SCTP) and multipath transmission control protocol (MPTCP); and network layer mobility solutions, such as mobile IP, proxy mobile IP (PMIP), general packet radio service tunneling protocol (GTP), and mobility and multihoming (Mobike) protocol.

However, while solutions exist to support IP layer session mobility, mobility of an active data session from the application layer perspective continues to be problematic. Present application layer mobility implementations require each application to directly implement its own mobility function and to switch interfaces when radio coverage changes from one RAT to another, such as from cellular to Wi-Fi, without impacting end-to-end performance of the application. These application layer mobility solutions are complex, requiring modification of each and every application. Moreover, existing application layer mobility solutions are not workable for real time applications. In this regard, while some hypertext transfer protocol (HTTP) based applications do have the ability to switch interfaces from one radio interface to another, real time applications, such as video conferencing applications and voice over Long Term Evolution (VoLTE), are unable to switch radio interfaces during an active session without dropping the active session or otherwise interrupting continuity of the session.

SUMMARY

Some example embodiments disclosed herein provide solutions to support seamless session mobility from the application layer perspective and address the aforementioned problems. In particular, some example embodiments anchor a data session for an application to a particular logical radio interface and transparently route data sent by the application to the logical radio interface to which it is bound to a selected physical radio interface for transmission. The physical interface selection (e.g., radio interface selection) and routing of data to the selected physical interface can be performed by a layer lower than the application layer, and thus can be transparent to the application. Accordingly, even a real time session can be handed over from one physical interface to another, such as from a cellular interface to a wireless local area network (WLAN) interface or vice versa, on a wireless communication device in accordance with such example embodiments without interrupting session continuity from the application perspective. Application developers can thus benefit by not having to build in session mobility support, as applications can take advantage of the seamless session mobility functionality provided by various example embodiments.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
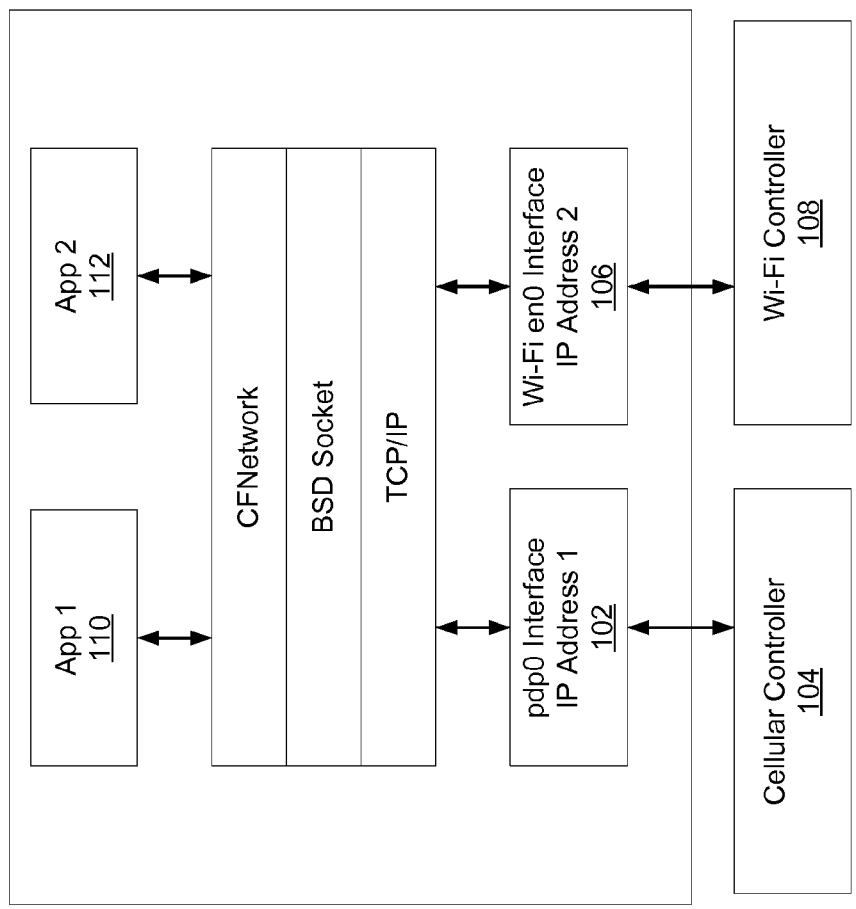
FIG. 1 illustrates an example prior art multi-mode device architecture that can be improved by some example embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

As discussed above, present mobility solutions do little to address application layer mobility for many commonly used real time applications. In this regard, existing solutions do not provide transparency of mobility of an active data session between physical interface for many applications, thereby necessitating applications to be aware of a physical interface switch and to take action to switch interfaces at the application layer. Existing mobility solutions are particularly deficient in the case of real time applications, as existing mobility solutions do not enable an active real time data session to be moved between radio interfaces without dropping the active real time data session.

Transport layer mobility (e.g., SCTP, MPTCP) handles mobility function at the transport layer and therefore the impact of transport layer mobility is transparent to the application layer. A mobility aware transport layer is able to switch data path from one interface to another, such as when a wireless communication device notices a change in radio coverage from one RAT to another. Transport layer mobility is supported by SCTP and MPTCP based transport protocols. However, transport layer mobility does not address mobility solutions for user datagram protocol (UDP) and transmission control protocol (TCP) based applications, and TCP and UDP are widely deployed transport protocols on the Internet.

Network layer mobility solutions handle mobility at the network layer. Mobile/IP, PMIP, Mobike and GTP are examples of some commonly used network layer mobility solutions. Mobile/IP is an example client based mobility management protocol, and requires each device to implement a mobile IP (MIP) client and the network to implement specialized mobility management servers (e.g., foreign agent and home agent). MIP-based solutions are not widely supported by present network infrastructure.

Network-based mobility architectures, such as GTP and PMIP, as used in Third Generation Partnership Project (3GPP) specifications, have been specified and provide a framework for a network based mobility solution. However, these architectures do not provide any specification for interface selection on a mobile communication device, or provide a solution for moving an active session from one interface to another on the mobile communication device. As such, while existing network-based mobility architectures can be suitable when only a single interface is supported by the device, there remains a need for mobility solutions on multi-mode devices that can be used in conjunction with existing 3GPP compliant network-based mobility solutions to support seamless mobility of real time applications in a heterogeneous radio environment.

FIG. 1 illustrates an example prior art multi-mode device architecture that can be improved by some example embodiments. In this regard, FIG. 1 illustrates an architecture within which an application can be unable to switch radio interfaces during an active session without adversely impacting application performance. The architecture can include a logical interface for each physical interface (e.g., each radio) implemented on the device. In the example of FIG. 1, the device can include a logical packet data protocol (PDP) interface (pdp0) 102, which can be associated with a cellular controller 104 (e.g., a physical cellular interface). The device can further include a logical Wi-Fi interface (en0) 106, which can be associated with a Wi-Fi controller 108 (e.g., a physical Wi-Fi interface). When an application, such as App1 110 or App 2 112, is launched, the application binds to a specific interface, such as pdp0 102 or en0 106. If the application switches from routing data packets to the logical interface pdp0 102 to routing data packets to the logical interface en0 106 in response to the device switching from using the cellular controller 104 to using the Wi-Fi controller 108 for network access when the device moves from coverage area of Wi-Fi to cellular radio, or vice versa, the resulting switch between interfaces can break the application layer connection and adversely impact application performance.

Some example embodiments disclosed herein provide solutions to support seamless session mobility from the application layer perspective and address the aforementioned problems. In particular, some example embodiments anchor an application data session to a logical interface associated with a first physical interface, such as, by way of non-limiting example, a physical cellular interface. A lower layer entity, such as an inter-radio access technology (iRAT) manager, can be configured to transparently route packets sent by the application to the logical interface to which the data session is anchored to a second physical interface, such as by way of non-limiting example, a physical WLAN interface, in an instance in which the second physical interface is active and the iRAT manager and/or other entity of the wireless communication device determines to transmit data for the data session via the second physical interface.

Some example embodiments categorize certain applications, such as certain real time applications, as mobility required applications for which support of seamless mobility can be provided by only exposing the applications to a single physical interface and/or logical interface associated therewith and transparently routing packets to an active or otherwise preferred physical radio interface, if needed for mobility purposes. In this regard, a mobility required application can be an application having a defined requirement to anchor a data session for the application to a specific logical interface without exposing the application to any further logical interfaces. If the device switches to another radio interface, the application can continue to send data packets for transmission to the logical interface to which it is anchored, but the data packets can be transparently routed to the active physical radio interface via which the data packets are to be transmitted.

As a more particular example, given an example device including a physical cellular interface and a physical WLAN interface, a mobility required application in accordance with some such embodiments may only be exposed to the logical interface for the physical cellular interface and a real time data session for the application can be anchored to the logical interface for the physical cellular interface. If the device determines to move the real time data session to the physical WLAN interface, the application can continue to send data for the data session to the logical interface for the physical cellular interface, and the data can be routed to the physical WLAN interface in a manner that is transparent to the application.

Example real time applications that can be categorized as mobility required applications can include video conferencing applications, such as FaceTime®, Skype®, and/or other real time applications, including various Internet-based real time applications and/or various real time applications that can be implemented on a wireless communication device. Further example applications that can be categorized as mobility required applications can further include "walled garden" applications, which can, for example, be real time applications and/or other applications that can be specified by a cellular carrier and/or other network carrier, a device user, a device manufacturer, an application developer, and/or the like. By way of non-limiting example, such walled garden applications can include VoLTE, IP Multimedia Subsystem (IMS), visual voicemail (VVM), multimedia messaging service (MMS), and/or the like. As applications specified as walled garden applications can vary by deployment, it will be appreciated that applications categorized as walled garden applications for the purposes of implementing various embodiments can vary in different scenarios.

It will be appreciated that techniques described herein can be applied to support seamless mobility for any application or data session, and not just for real time applications or real time data sessions. Thus, where examples are described with respect to real time applications and real time data sessions, it will be appreciated that those examples are provided by way of example, and not by way of limitation.

As an example within the context of the example of FIG. 1, the App 1 110 and/or App 2 112 can be defined as a mobility required application. The mobility required application can be exposed to the pdp0 102 interface, while the en0 interface 106 can be hidden from the application. A data session for the application can accordingly be anchored to the pdp0 102 interface. In this regard, walled garden applications in some such example embodiments can always be bound to the pdp0 102 interface irrespective of whether the cellular or Wi-Fi interfaces are active. Thus, for example, in some such embodiments, if seamless mobility is configured (e.g., in conformance with a user preference, carrier specification, and/or other source that can specify a mobility configuration), a walled garden application can bind to the pdp0 interface 102 even if only the physical WLAN interface (e.g., the Wi-Fi controller 108) active. An underlying layer(s) and/or entity implemented therein, such as the iRAT manager of some example embodiments, can be configured to route packets sent over the pdp0 interface 102 to the Wi-Fi controller 108 for transmission in a manner that is transparent to the application. As a further example, in some such example embodiments, if the device performs a network layer handover from cellular to a WLAN, walled garden applications can continue to be anchored to the pdp0 interface 102, and an underlying layer can be configured to route packets sent over the pdp0 interface 102 to the Wi-Fi controller 108 for transmission. Accordingly, data for a data session can be transmitted via the Wi-Fi controller 108 where appropriate while the application continues to be anchored and exposed only to the pdp0 interface 102.

Such example embodiments accordingly provide for seamless session mobility from the perspective of the application, including for real time applications, by anchoring a data session to a particular logical interface and implementing an iRAT manager at a lower layer disposed between the application layer and the physical layer that can be configured to route data packets sent to the logical interface by the application to an active or preferred physical interface at a given time in a manner that is transparent to the application, even if the active/preferred physical interface is not the physical interface with which the logical interface is associated. Further, such example embodiments can support seamless mobility without necessitating major changes to device software or network infrastructure.

These and other embodiments are discussed below with reference to FIGS. 2-8. However, those skilled in the art will readily appreciate that the detailed description given herein with respect to these Figures is for explanatory purposes only and should not be construed as limiting.

Figure 2:
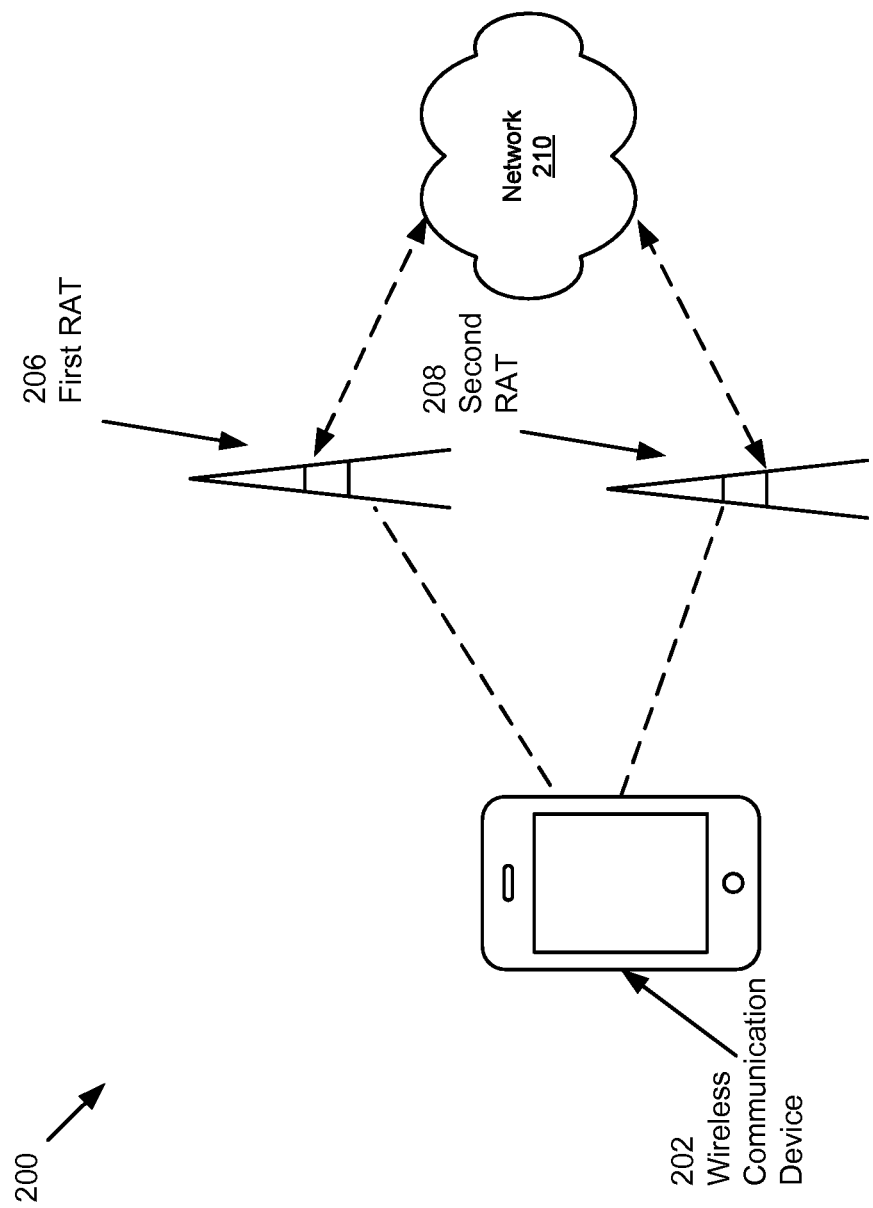
FIG. 2 illustrates a wireless communication system in accordance with some example embodiments.

FIG. 2 illustrates an example wireless communication system 200 in accordance with some example embodiments. The system 200 can include a wireless communication device 202, which, by way of non-limiting example, can be a cellular phone, such as a smart phone device, a tablet computing device, a laptop computing device, or other computing device that can be configured to operate as a multi-mode device supporting multiple RATs. For example, the wireless communication device 202 can be configured to establish a connection to a radio access network implementing a first RAT 206 (hereinafter, referred to as "the first RAT 206") and a radio access network implementing a second RAT 208 (hereinafter, referred to as "the second RAT 208"). In some instances, the wireless communication device 202 can have concurrent network connections to both the first RAT 206 and the second RAT 208. Additionally or alternatively, in some instances, the wireless communication device 202 can transition from the first RAT 206 to the second RAT 208, or vice versa, such as in response to moving in and out of a coverage area of the first RAT 206 and/or second RAT 208. The wireless communication device 202 can accordingly include multiple physical radio interfaces, each of which can be configured to support communication via one or more respective RATs. For example, the wireless communication device 202 can include a first physical interface that can be configured to support communication via the first RAT 206 and a second physical interface that can be configured to support communication via the second RAT 208.

The first RAT 206 and the second RAT 208 can each be respective radio access networks that allow the wireless communication device 202 to communicate with a network 210. The network 210 can be any network or combination of networks, and in some example embodiments can be the Internet. For example, in some embodiments, the network 210 or a portion thereof, alone or in combination with one or more further networks, can provide a heterogeneous network that can be accessed via multiple radio access networks. In some such embodiments, the heterogeneous network can support network layer mobility such that an active data session can be transitioned from the first RAT 206 to the second RAT 208 and/or vice versa.

The first RAT 206 and the second RAT 208 can each implement any type of RAT that can be used to support network communication. For example, one or both of the first RAT 206 and second RAT 208 can be cellular RATs. For example, the system 200 can include a radio access network implementing a Long Term Evolution (LTE) RAT, such as various releases of the LTE standard specified by the 3GPP, including various releases of LTE, LTE-Advanced (LTE-A), and/or other present or future releases using LTE technology. As another example, the system 200 can include a radio access network implementing a third generation (3G) cellular RAT, such as Wideband Code Division Multiple Access (WCDMA) or other Universal Mobile Telecommunications System (UMTS) RAT, such as Time Division Synchronous Code Division Multiple Access (TD-SCDMA); CDMA2000; 1×RTT; and/or the like. As another example, the system 200 can include a radio access network implementing a second generation (2G) cellular RAT, such as a Global System for Mobile Communications (GSM) RAT. In some example embodiments, the system 200 can include a radio access network implementing a Worldwide Interoperability for Microwave Access (WiMAX) RAT.

In some example embodiments, the system 200 can include a radio access network implementing a WLAN RAT. In embodiments in which one of the first RAT 206 or the second RAT 208 is a WLAN, the WLAN can implement any appropriate WLAN technology, including, but not limited to a Wi-Fi technology based on an Institute of Electrical and Electronics Engineers (IEEE) 802.11 standard, such as one or more of 802.11a/b/g/n/ac/ad/etc. It will be appreciated, however, that example embodiments described with respect to the use of Wi-Fi and/or other IEEE-specified WLAN RAT are provided by way of example, and not by way of limitation. In this regard, any appropriate WLAN RAT can be used in addition to or in lieu of IEEE 802.11 in accordance with various example embodiments.

Figure 3:
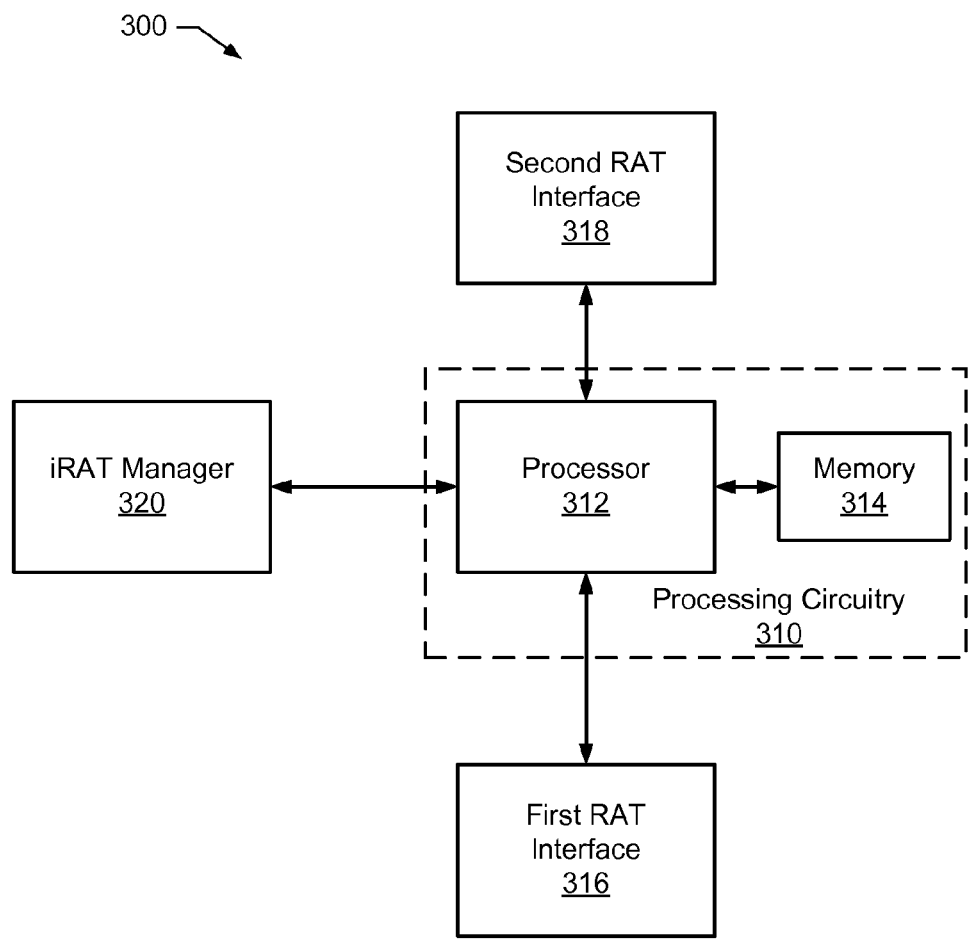
FIG. 3 illustrates a block diagram of an apparatus that can be implemented on a wireless communication device in accordance with some example embodiments.

FIG. 3 illustrates a block diagram of an apparatus 300 that can be implemented on a wireless communication device, such as wireless communication device 202, in accordance with some example embodiments. In this regard, when implemented on a computing device, such as wireless communication device 202, apparatus 300 can enable the computing device to operate within the system 200 in accordance with one or more example embodiments. For example, the apparatus 300 can enable a computing device to support seamless session mobility in accordance with various example embodiments. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of the apparatus 300 in accordance with various example embodiments, and thus can provide means for performing functionalities of the wireless communication device 202 in accordance with various example embodiments. The processing circuitry 310 can be configured to perform data processing, application execution and/or other processing and management services according to one or more example embodiments.

In some embodiments, the apparatus 300 or a portion(s) or component(s) thereof, such as the processing circuitry 310, can include one or more chipsets, which can each include one or more chips. The processing circuitry 310 and/or one or more further components of the apparatus 300 can therefore, in some instances, be configured to implement an embodiment on a chipset. In some example embodiments in which one or more components of the apparatus 300 are embodied as a chipset, the chipset can be capable of enabling a computing device to operate in the system 200 when implemented on or otherwise operably coupled to the computing device. Thus, for example, one or more components of the apparatus 300 can provide a chipset configured to enable a computing device to operate over the first RAT 206 and/or over the second RAT 208. As a more particular example, one or more components of the apparatus 300 of some example embodiments can provide a cellular baseband chipset, a WLAN chipset, some combination thereof, or the like.

In some example embodiments, the processing circuitry 310 can include a processor 312 and, in some embodiments, such as that illustrated in FIG. 2, can further include memory 314. The processing circuitry 310 can be in communication with or otherwise control a first RAT interface 316, second RAT interface 318, and/or iRAT manager 320.

The processor 312 can be embodied in a variety of forms. For example, the processor 312 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of the apparatus 300 as described herein. In some example embodiments, the processor 312 can be configured to execute instructions that can be stored in the memory 314 or that can be otherwise accessible to the processor 312. As such, whether configured by hardware or by a combination of hardware and software, the processor 312 capable of performing operations according to various embodiments while configured accordingly.

In some example embodiments, the memory 314 can include one or more memory devices. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, first RAT interface 316, second RAT interface 318, or iRAT manager 320 via one or more buses and/or other interface(s) for passing information among components of the apparatus 300.

The apparatus 300 can further include a first RAT interface 316. The first RAT interface 316 can comprise a physical interface configured to enable the apparatus 300 to establish and support a connection to the first RAT 206. As such, the first RAT interface 316 can include, for example, an antenna (or multiple antennas) and supporting hardware and/or software for enabling communications in accordance with a RAT implemented by the first RAT 206. In some example embodiments, the first RAT interface 316 can be at least partially implemented as a chipset, which can enable a computing device to operate on the first RAT 206 when implemented on the device.

The apparatus 300 can additionally include a second RAT interface 318. The Second RAT interface 318 can comprise a physical interface configured to enable the apparatus 300 to establish and support a connection to the second RAT 208. As such, the second RAT interface 318 can include, for example, an antenna (or multiple antennas) and supporting hardware and/or software for enabling communications with a RAT implemented by the second RAT 208. In some example embodiments, the Second RAT interface 318 can be at least partially implemented as chipset, which can enable a computing device to operate on the second RAT 208 when implemented on the device.

The first RAT interface 316 and second RAT interface 318 can each have a respective associated logical interface to which a data session for an application can be bound. For example, in accordance with some embodiments, a data session for an application can be anchored to a logical interface associated with the first RAT interface 316. As described further herein, data (e.g., data packets) sent by the application to the logical interface associated with the first RAT interface 316 can, in some instances, be routed for transmission via the second RAT interface 318 in a manner that can be transparent to the application.

The apparatus 300 can further include iRAT manager 320. The iRAT manager 320 can be embodied as various means, such as circuitry, hardware, a computer program product including a computer readable medium (for example, the memory 314) storing computer readable program instructions that are executable by a processing device (for example, the processor 312), or some combination thereof. In some embodiments, the processor 312 (or the processing circuitry 310) can include, or otherwise control the iRAT manager 320. In some example embodiments, the iRAT manager 320 can be at least partially implemented in a logical layer that can be disposed between a logical application layer in which an application can be implemented and a logical physical layer, which can include the physical interfaces, such as the first RAT interface 316 and the second RAT interface 318.

The iRAT manager 320 can be configured to control routing of packets sent by an application to a logical interface to which the application can be anchored to an active or otherwise preferred physical interface. Thus, for example, if an application is anchored to the logical interface associated with the first RAT interface 316 and the second RAT interface 318 is active or otherwise preferred, the iRAT manager 320 can be configured to control routing of packets sent by the application to the logical interface associated with the first RAT interface 316 to the second RAT interface 318 for transmission by the second RAT interface 318. This routing can be transparent to the application. The iRAT manager 320 can accordingly be configured to ensure that appropriate routes are added and/or otherwise activated on the wireless communication device 202 to route application layer data for the data session to the appropriate physical layer interface.

As a particular example, consider an example embodiment in which the first RAT interface 316 can comprise a physical cellular interface having an associated logical cellular interface and the second RAT interface 318 can comprise a physical WLAN interface having an associated logical WLAN interface. An application (e.g., a "mobility required application"), such as a real time application, walled garden application, and/or other application, can have a defined requirement for any data sessions for the application to be anchored to the logical cellular interface. As such, the application may not be exposed to the logical WLAN interface and/or to the physical WLAN interface. In some such embodiments, if the application has a defined requirement for a data session to be anchored to the logical cellular interface, the data session can be anchored to the logical cellular interface even if the wireless communication device does not have an active connection to a cellular access network. If the wireless communication device has an active connection to a WLAN, the iRAT manager 320 can route data sent to the logical cellular interface by the application to the physical WLAN interface for transmission over the WLAN. This routing can be transparent to the application such that seamless mobility for the data session can be provided for mobility between cellular and WLAN without impacting the application layer.

In some example embodiments, the iRAT manager 320 can be configured to determine which physical interface to use for a data session at a given time. This decision can be based on a variety of factors that can be considered by the iRAT manager 320, as further described herein below.

For example, in some embodiments, the iRAT manager 320 can factor a defined policy for physical interface selection. In this regard, a policy can specify how a data session should be routed given the availability of various physical interfaces for data transmission. Thus, for example, if the wireless communication device 202 has active connections to both the first RAT 206 and the second RAT 208 such that a data session can be transmitted via either the first RAT interface 316 or the second RAT interface 318, the iRAT manager 320 of some example embodiments can be configured to route data sent by the application to the logical interface to which the data session is anchored to the one of the first RAT interface 316 or second RAT interface 318 that is preferred in accordance with the policy. The policy can, for example, be defined by a user, device manufacturer, network operator, application developer, and/or other entity.

In some embodiments, a policy can specify a preference for a particular interface on a global basis such that the preference can be applied regardless of the type of application or data session. For example, in some embodiments, the second RAT interface 318 can be globally preferred over the first RAT interface 316 for all applications if a connection to the second RAT 208 is available.

Additionally or alternatively, in some example embodiments, a policy can be specified on an application-specific and/or session type-specific basis such that interface preference rules can vary depending on the type of application and/or on the type of data session. For example, a different policy can be applied to a real time video application than to a web browser application.

As a further example, the iRAT manager 320 of some example embodiments can additionally or alternatively consider observed network conditions for one or more available radio access networks. In this regard, the iRAT manager 320 of some example embodiments can be configured to determine the suitability of a radio access network for supporting a data session based at least in part on the observed network conditions for the radio access network. The observed network conditions can include any of a variety of metrics that can be determined by and/or otherwise available at various layers of the wireless communication device 202, such as the radio link layer, network layer, media access control (MAC) layer, application layer, and or one or more further layers of the wireless communication device 202. By way of non-limiting example, the observed network conditions can include various metrics indicative of the quality of a radio access network, such as channel quality measurements, network loading conditions, and/or the like. The iRAT manager 320 of some such example embodiments can be configured to access radio link feedback from one or more of the first RAT interface 316 or the second RAT interface 318 that can be indicative of observed network conditions, and can use this information to select a physical interface via which to transmit data for a data session.

In embodiments in which the iRAT manager 320 can factor channel quality measurements to determine which physical interface to use for a data session, any appropriate channel quality measurement that can be measured or otherwise observed (e.g., by one or more of the radio link layer, network layer, MAC layer, or application layer) for a given radio access network(s) can be considered. It will be appreciated that the types of channel quality measurements that can be measured and/or otherwise observed for a given radio access network can vary depending on the type of RAT implemented by the radio access network. By way of non-limiting example, various channel quality measurements that can be considered can include a received signal strength indicator (RSSI), reference signal received quality (RSRQ), reference signal received power (RSRP), received signal code power (RSCP), signal to noise ratio (SNR), signal to noise plus interference ratio (SINR), packet error rate (PER), bit error rate (BER), and/or the like, of one or more of the first RAT 206 or second RAT 208. The measured channel quality can be used as a basis for making a network selection. For example, if a data session is being transmitted over the first RAT 206 and a channel quality of the first RAT 206 drops below a channel quality threshold and a connection to the second RAT 208 is available, the iRAT manager 320 can determine to route data for the data session to the second RAT interface 318 for transmission over the second RAT 208. As another example, if a data session is being transmitted over the first RAT 206 and a channel quality of the second RAT 208 satisfies a channel quality threshold, the iRAT manager 320 can determine to route data for the data session to the second RAT interface 318 for transmission over the second RAT 208.

The iRAT manager 320 can be configured to similarly apply loading conditions of one or more of the first RAT 206 and/or the second RAT 208 to make an interface selection decision. For example, if a data session is being transmitted over the first RAT 206 and a loading of the first RAT 206 exceeds a threshold loading level, the iRAT manager 320 can determine to route data for the data session to the second RAT interface 318 for transmission over the second RAT 208 if a connection to the second RAT 208 is available.

It will be appreciated that policies for interface selection that can be applied by the iRAT manager 320 of some example embodiments can define interface selection preferences in terms of network conditions. For example, in some embodiments, a policy can define a threshold network condition for switching interfaces to handover a data session between radio access networks if multiple physical interfaces are active. As a more particular example, if connections to both a WLAN and a cellular access network are available and WLAN is generally preferred for a data session, but an RSSI of the WLAN does not exceed a threshold RSSI that can be specified by the policy, the data session can be maintained on the physical cellular interface.

In some example embodiments, the iRAT manager 320 can be further configured to factor in the past performance of a radio access network when determining which physical interface to use for a data session. In such embodiments, the iRAT manager 320 can be configured to maintain data regarding previously observed network conditions on respective radio access networks. Thus, for example, if a radio access network, such as a WLAN having a particular service set identification (SSID), a particular cellular access network, or the like, has been previously observed to provide poor performance (e.g., in terms of channel quality, error rate, data throughput rate, and/or other metrics that can be used to measure network quality), then the iRAT manager 320 can determine to not select a physical interface having a connection to that network for routing of data for a data session. If, however, the radio access network has been previously observed to provide good performance, the iRAT manager 320 can determine to select a physical interface having a connection to that network for routing of data for a data session. For example, in some embodiments, a threshold performance rate can be specified for selecting whether to use a radio access network. The threshold performance rate can, for example, be a threshold channel quality, an average throughput rate, and/or other performance metric that can be used to evaluate a radio access network. If an average performance level and/or other previously observed performance level of a radio access network exceed or otherwise satisfy the threshold performance level, the iRAT manager 320 can be configured to select to use the radio access network to support a data session, and can route data for the data session to the corresponding physical interface. If, however, the previously observed performance level does not satisfy the threshold performance level, the iRAT manager 320 can select another available physical interface rather than using the radio access network to support the data session.

In some embodiments, the iRAT manager 320 can additionally or alternatively consider information about the mobility state of the wireless communication device 202 when selecting a physical interface for a data session. For example, given the more limited range of WLANs, if the wireless communication device 202 is in a high mobility state, such as a mobility state (e.g., in terms of instantaneous velocity, average velocity over a period of time, acceleration, a distance traveled over a period of time, and/or other measurement of mobility) exceeding a threshold mobility (e.g., a threshold velocity, threshold acceleration, a threshold distance traveled over a period of time, and/or other threshold measurement of mobility), the iRAT manager 320 can determine not to use a WLAN interface for transmission of a data session, even if the WLAN interface would otherwise be the preferred interface. If, however, the mobility state of the wireless communication device 202 is low, such as if the mobility state does not exceed a threshold mobility, the iRAT manager 320 can select to use the WLAN interface for a data session.

It will be appreciated that the foregoing examples of factors that can be evaluated by the iRAT manager 320 when making an interface selection decision are provided by way of example, and not by way of limitation, as the iRAT manager 320 can be configured to consider any of a variety of additional or alternative factors. For example, in some embodiments, if information is known about the backhaul quality of a backhaul associated with a radio access network, the iRAT manager 320 can factor that information when making an interface selection decision.

Figure 4:
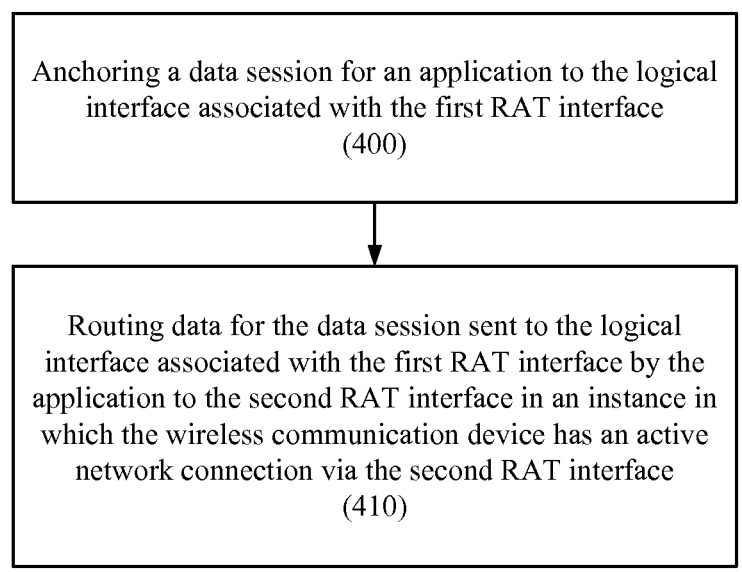
FIG. 4 illustrates a flowchart of an example method for providing seamless session mobility according to some example embodiments.

FIG. 4 illustrates a flowchart of an example method for providing seamless session mobility according to some example embodiments. In this regard, FIG. 4 illustrates operations that can be performed by the wireless communication device 202 in accordance with some example embodiments. One or more of processing circuitry 310, processor 312, memory 314, first RAT interface 316, second RAT interface 318, or iRAT manager 320 can, for example, provide means for performing the operations illustrated in and described with respect to FIG. 4.

Operation 400 can include the wireless communication device 202 anchoring a data session, such as a real time data session, for an application to the logical interface associated with the first RAT interface 316. The application can, for example, be an application (e.g., a mobility required application) having a defined requirement to anchor any data sessions for the application to the logical interface associated with the first RAT interface 316. Thus, for example, in some embodiments, the data session can be anchored to the logical interface associated with the first RAT interface 316 regardless of whether the first RAT interface 316 is active when the data session is established and/or whether the second RAT interface 318 is active when the data session is established.

Operation 410 can include the iRAT manager 320 routing data (e.g., data packets and/or other units of data) for the data session sent to the logical interface associated with the first RAT interface 316 by the application to the second RAT interface 318 in at least some instances in which the wireless communication device has an active network connection (e.g., a connection to the second RAT 208) via the second RAT interface 318. The iRAT manager 320 can accordingly be configured to ensure that appropriate routes are added and/or otherwise activated on the wireless communication device 202 to route application layer data for the data session to the appropriate physical layer interface. The decision by the iRAT manager 320 to route data packets for the data session to the second RAT interface 318 can, for example, be based on a configured interface selection policy, observed network conditions for the first RAT 206 and/or second RAT 208, some combination thereof, and/or other factors that can be evaluated when selecting a physical interface to support transmission of data for a data session.

In some example embodiments, operation 410 can be performed in response to a decision to handover the data session from the first RAT 206 to the second RAT 208. In some embodiments, the handover decision can be made at least partially in response to the wireless communication device 202 entering a coverage area of the second RAT 208 while connected to a heterogeneous network, such as the network 210, which can be configured to support network based mobility. The wireless communication device 202 can establish a connection to the second RAT 208 and then move the data session to the second RAT 208. The iRAT manager 320 can enable application layer handover of the data session by routing data sent to the logical interface associated with the first RAT interface 316 by the application to the second RAT interface 318.

In some example embodiments, a decision to handover the data session from the first RAT 206 to the second RAT 208 can be made by the iRAT manager 320, such as based on an interface selection policy, an observed network conditions(s), and/or other factors. For example, the wireless communication device 202 of some example embodiments can measure a channel quality, such as by way of non-limiting example, RSSI, RSRQ, RSRP, RSCP, SNR, SINR, PER, BER, and/or the like, of one or more of the first RAT 206 or second RAT 208. The measured channel quality can be used by the iRAT manager 320 as a basis for selecting a physical interface to use for transmission of data for a data session. Additionally or alternatively, the wireless communication device 202 can determine a loading condition of the first RAT 206 and/or the second RAT 208 and the iRAT manager 320 can use the determined loading condition to make a network selection. It will be appreciated that one or more further observed wireless metrics can be used in addition to or in lieu of measured channel quality and/or loading conditions to make a physical interface selection in various example embodiments. The decision to handover the data session can additionally or alternatively be based on any of the other interface selection factors discussed above, such as past performance of a radio access network, a mobility state of the wireless communication device 202, information about the quality of the backhaul for a given radio access network, and/or other factor(s) that can be used to select an appropriate physical interface for a data session.

It will be appreciated that while a data session is active, the data session can be handed over between the first RAT 206 and the second RAT 208 multiple times, such as in response to changing network conditions, mobility of the wireless communication device 202, and/or other factors that can affect accessibility of a radio access network and/or interface selection. Thus, for example, after performing operation 410, the iRAT manager 320 can determine to cease routing the data for the data session to the second RAT interface 318, and can instead route data for the data session to the first RAT interface 316 for transmission over the first RAT 206 such that the data session can be handed over to the first RAT 206.

Mobility of a real time data session and/or other data session between the first RAT 206 and the second RAT 208 can be supported by network-based mobility solutions, such as PMIP and/or GTP. In some example embodiments, the same IP address can be used for the wireless communication device 202 within the network 210 even when the wireless communication device 202 moves from a coverage area of the first RAT 206 to the coverage area of the second RAT 208, and vice versa. A network-based mobility anchor can be responsible to assign an IP address that is routable within the network 210 regardless of whether the wireless communication device 202 is engaging in the data session via the first RAT 206 or the second RAT 208.

Figure 5:
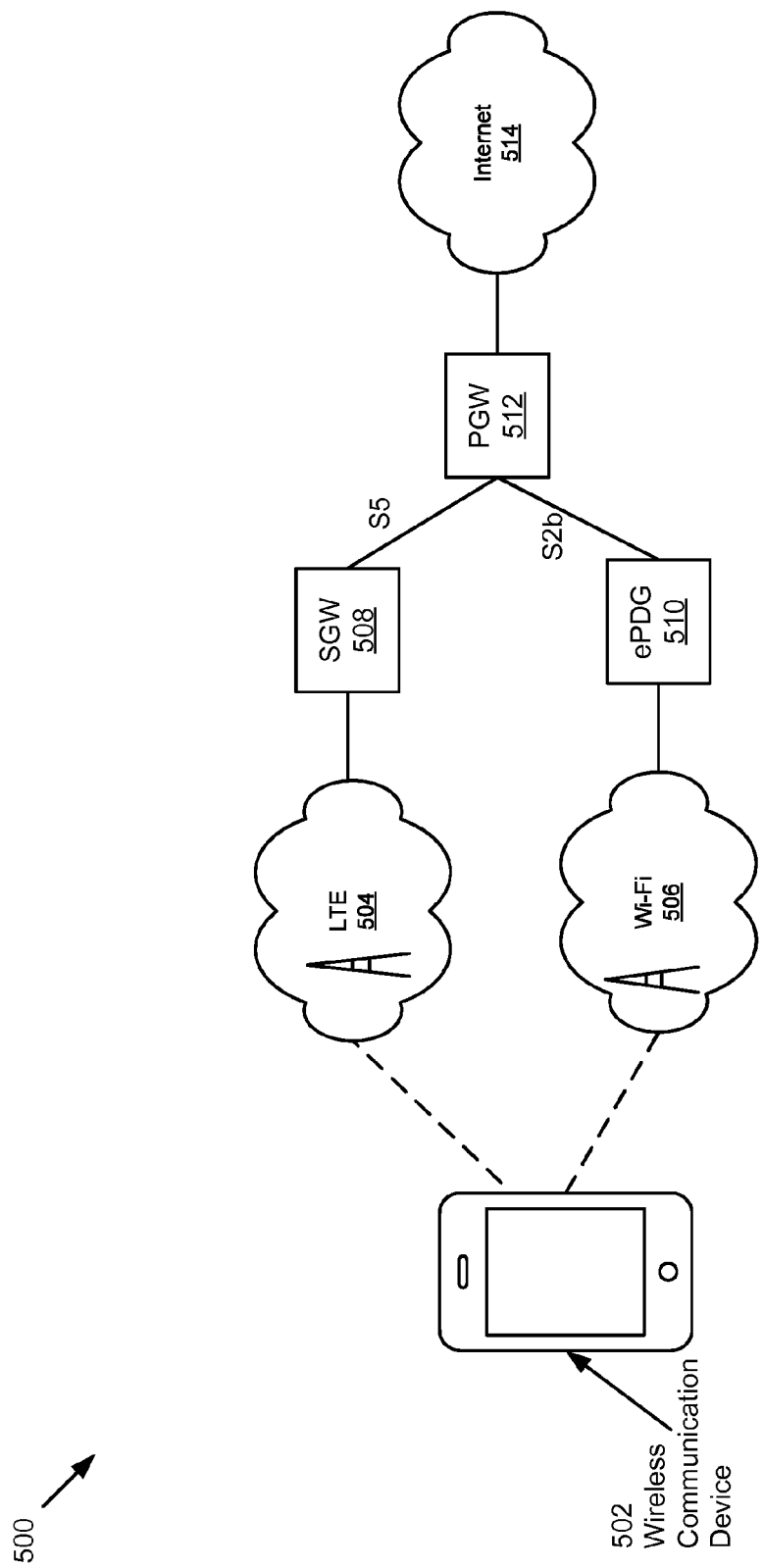
FIG. 5 illustrates a wireless communication system in accordance with some example embodiments.

FIG. 5 illustrates a wireless communication system 500 in accordance with some example embodiments. The system 500 can, for example, be an embodiment of the system 200 in which an LTE access network and a Wi-Fi radio access network can be implemented. The system 500 can include a wireless communication device 502, which can be an embodiment of the wireless communication device 202. As such, the apparatus 300 can be implemented on wireless communication device 502 in accordance with some example embodiments.

The system 500 can further include an LTE network 504 and Wi-Fi network 506. The LTE network 504 can, for example, be an embodiment of the first RAT 206. The Wi-Fi network 506 can, for example, be an embodiment of the second RAT 208. Both the LTE network 504 and Wi-Fi network 506 can be interfaced with the Internet 514, which can, for example, be an embodiment of the network 210. More particularly, the LTE network 504 can be interfaced with a serving gateway (SGW) 508, which can in turn be interfaced with a packet data network (PDN) gateway (PGW) 512 via an S5 interface. The Wi-Fi network 506 can be interfaced with an evolved packet data gateway (ePDG) 510, which can be interfaced with the PGW 512 via an S2b interface. The PGW 512 can, in turn, be interfaced with the Internet 514. The wireless communication device 502 can accordingly access the Internet 514 via either or both of the LTE network 504 and the Wi-Fi network 506.

In some example embodiments, the ePDG 510 may only be implemented or used if the Wi-Fi network 506 is not trusted by a network operator (e.g., an operator of the LTE network 504). If the Wi-Fi network 506 is trusted by the operator, then use of the ePDG 510 can be omitted in some example embodiments. The wireless communication device 502 can be configured to tunnel data packets to a WLAN access gateway (WAG) or a WLAN access point using any of a variety of available tunneling protocols, such as, by way of non-limiting example, Generic Routing Encapsulation (GRE). The WAG or WLAN access point can be configured to map received tunneled packets to the PGW 512.

In order to maintain session continuity at the network layer, IP sessions can be anchored at the PGW 512. Packets sent over cellular or Wi-Fi radio interfaces of the wireless communication device 502 can be tunneled to the PGW 512 over the Wi-Fi radio or cellular radio. The PGW 512 can be configured to ensure that the same IP address is assigned to the wireless communication device 502 when it moves from the Wi-Fi network 506 to the LTE network 504 or vice versa. In this regard, the PGW 512 can, for example, ensure that the same IP address is assigned to the logical WLAN interface as can be assigned to the logical cellular interface to support mobility between the Wi-Fi network 506 and the LTE network 504. Network mobility can, for example, be handled by PMIP or GTP based solution in accordance with 3GPP specifications. This network mobility can be leveraged by the wireless communication device 502 to support seamless session mobility at the application layer in accordance with various embodiments, such that a data session can be moved between the physical cellular interface and the physical WLAN interface to support handover of the data session between the LTE network 504 and Wi-Fi network 506.

Figure 6A:
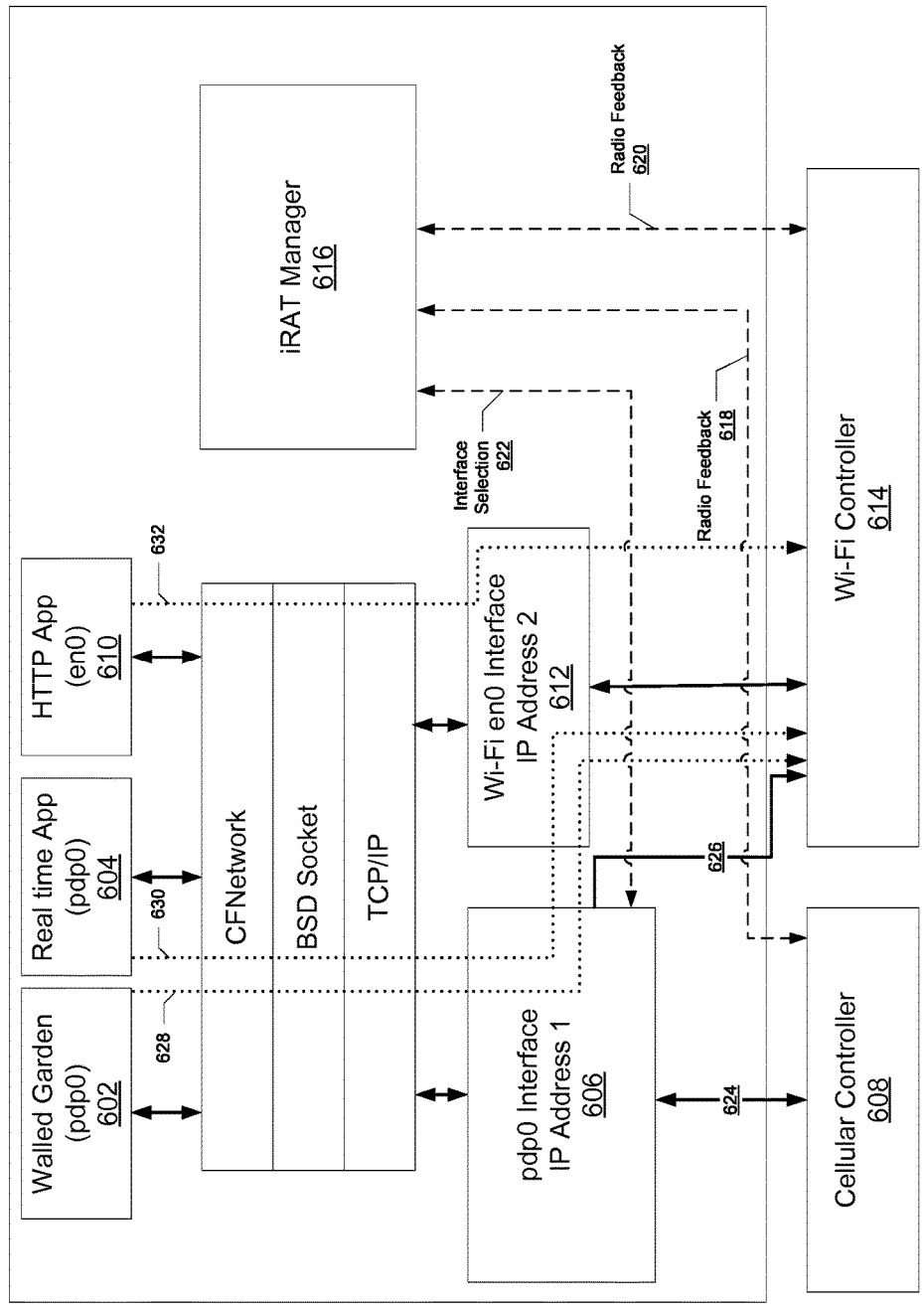
FIGS. 6A-6B illustrate routing of data packets within a multi-mode device architecture in accordance with some example embodiments.
Figure 6B:
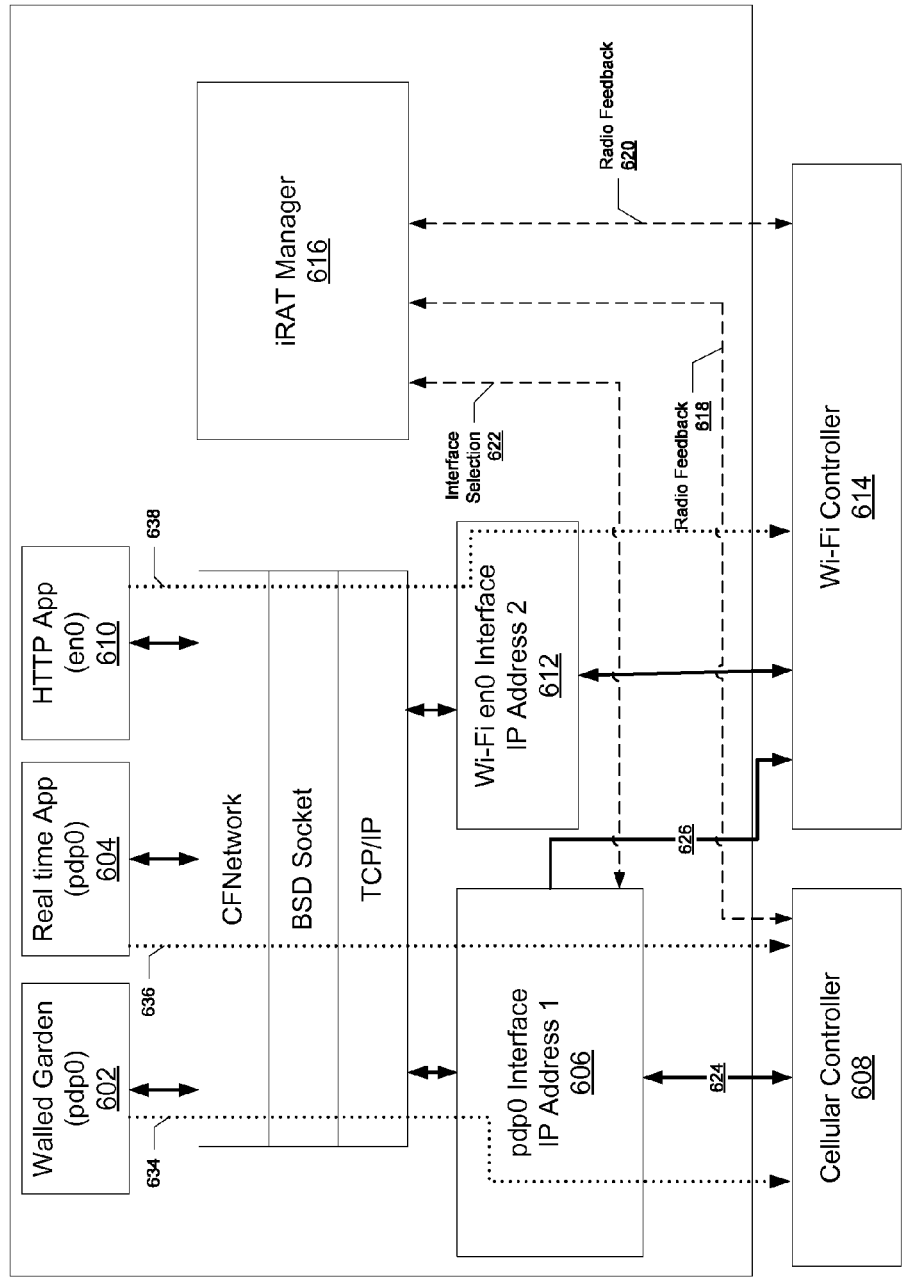

FIGS. 6A-6B illustrate routing of data packets within a multi-mode device architecture in accordance with some example embodiments. More particularly, FIGS. 6A-6B illustrate routing of data packets within a multi-mode device, such as the wireless communication device 202 and/or wireless communication device 502, that can be operating within a wireless communication system, such as the system 200 and/or the system 500, in accordance with some example embodiments. The device architecture of FIGS. 6A and 6B can accordingly be implemented on a wireless communication device, such as wireless communication device 202 and/or wireless communication device 502, which can include the apparatus 300 in accordance with some example embodiments. It will be appreciated, however, that the architecture of FIGS. 6A and 6B is provided by way of example, and not by way of limitation, such that alternative architectures are contemplated within the scope of the disclosure.

In the example of FIGS. 6A and 6B, the applications 602 (e.g., a walled garden application) and 604 (e.g., a real time application, such as VoLTE or FaceTime®) can be anchored to a pdp0 interface 606. The pdp0 interface 606 can be a logical cellular interface associated with a cellular controller 608, which can provide a physical cellular interface. The cellular controller 608 can, for example, be an embodiment of the first RAT interface 316. An HTTP application 610 can be bound to the en0 interface 612, which can be associated with a Wi-Fi controller 614, which can provide a physical WLAN interface. The Wi-Fi controller 614 can, for example, be an embodiment of the second RAT interface 318. In some example embodiments, the applications 602 and 604 may not be exposed to the en0 interface 612 and/or to the Wi-Fi controller 614.

The iRAT manager 616 can be an embodiment of the iRAT manager 320, and can be configured to control routing of packets sent to the pdp0 interface 606 by the applications 602 and 604 to the physical Wi-Fi controller 614 in an instance in which the data sessions for the applications 602 and 604 have been moved to the Wi-Fi controller 614 for transmission over a WLAN. In some example embodiments, the iRAT manager 616 can be configured to utilize radio feedback 618 that can be received from the cellular controller 608 and/or radio feedback 620 that can be received from the Wi-Fi controller 614 to determine which physical interface to use for a data session. The radio feedback 618 can be indicative of conditions on a cellular access network, such as the LTE network 504, which can be measured or otherwise observed by the cellular controller 608. Similarly, the radio feedback 620 can be indicative of conditions on a WLAN, such as the Wi-Fi network 506, which can be measured or otherwise observed by the Wi-Fi controller 614. The radio feedback 618 and 620 can, for example, be indicative of a measured or otherwise observed channel quality, network loading conditions, and/or other wireless metrics that can be observed for a cellular access network and/or for a WLAN.

The iRAT manager 616 can be further configured to consider additional or alternative factors, such as a radio interface selection policy (or policies), when making an interface selection decision.

The iRAT manager 616 can be configured to provide interface selection and routing information 622 to the pdp0 interface 606 to control routing of data sent to the pdp0 interface 606 by the applications 602 and 604. Thus, for example, when the iRAT manager 616 determines that data for the application 602 and/or application 604 should be sent over a cellular access network, the iRAT manager 616 can cause the pdp0 interface 606 to send the data via the path 624 to the cellular controller 608 for transmission over the cellular access network. As a further example, when the iRAT manager 616 determines that data for the application 602 and/or application 604 should be sent over a WLAN, the iRAT manager 616 can cause the pdp0 interface 606 to send the data via the path 626 to the Wi-Fi controller 614 for transmission over the WLAN. The iRAT manager 616 can accordingly be configured to make a handover decision (e.g., based at least in part on the radio feedback 618, radio feedback 620, a radio interface selection policy (or policies), and/or other factors), and can control handover of data sessions for the applications 602 and 604 between the cellular controller 608 and Wi-Fi controller 614 by controlling routing of data sent to the pdp0 interface 606 for data sessions anchored to the pdp0 interface 606.

FIG. 6A illustrates an example of routing data packets in an instance in which the Wi-Fi controller 614 is active such that a connection to a WLAN is available. As illustrated in FIG. 6A, data packets sent by the application 602 and/or application 604 when the Wi-Fi controller 614 is active can be routed from the application to the socket, to the TCP/IP stack, to the pdp0 interface 606, and then to the Wi-Fi controller 614. In this regard, the iRAT manager 616 can be configured to transparently route data packets for the applications 602 and 604 based on which interface(s) is active and/or which interface is preferred at a given point in time, while from the perspective of the applications 602 and 604, the applications can be anchored to the pdp0 interface 606 and can be unaware of the usage of the Wi-Fi controller 614 for transmission of their data sessions. Packets sent by the application 610 can be routed from the application 610 to the socket, to the TCP/IP stack, to the en0 interface 612, to the Wi-Fi controller 614 for transmission over the WLAN.

FIG. 6B illustrates an example of routing data packets in an instance in which the Wi-Fi controller 614 is not active (e.g., where there is not an available WLAN connection), or in an instance in which usage of the cellular interface is preferred (e.g., due to observed network conditions, a policy, and/or other factors that can be considered in selecting a physical interface). As illustrated in FIG. 6B, data packets sent by the application 602 and/or application 604 can be routed from the application to the socket, to the TCP/IP stack, to the pdp0 interface 606, and then to cellular controller 608 for transmission over a cellular access network.

Figure 7:
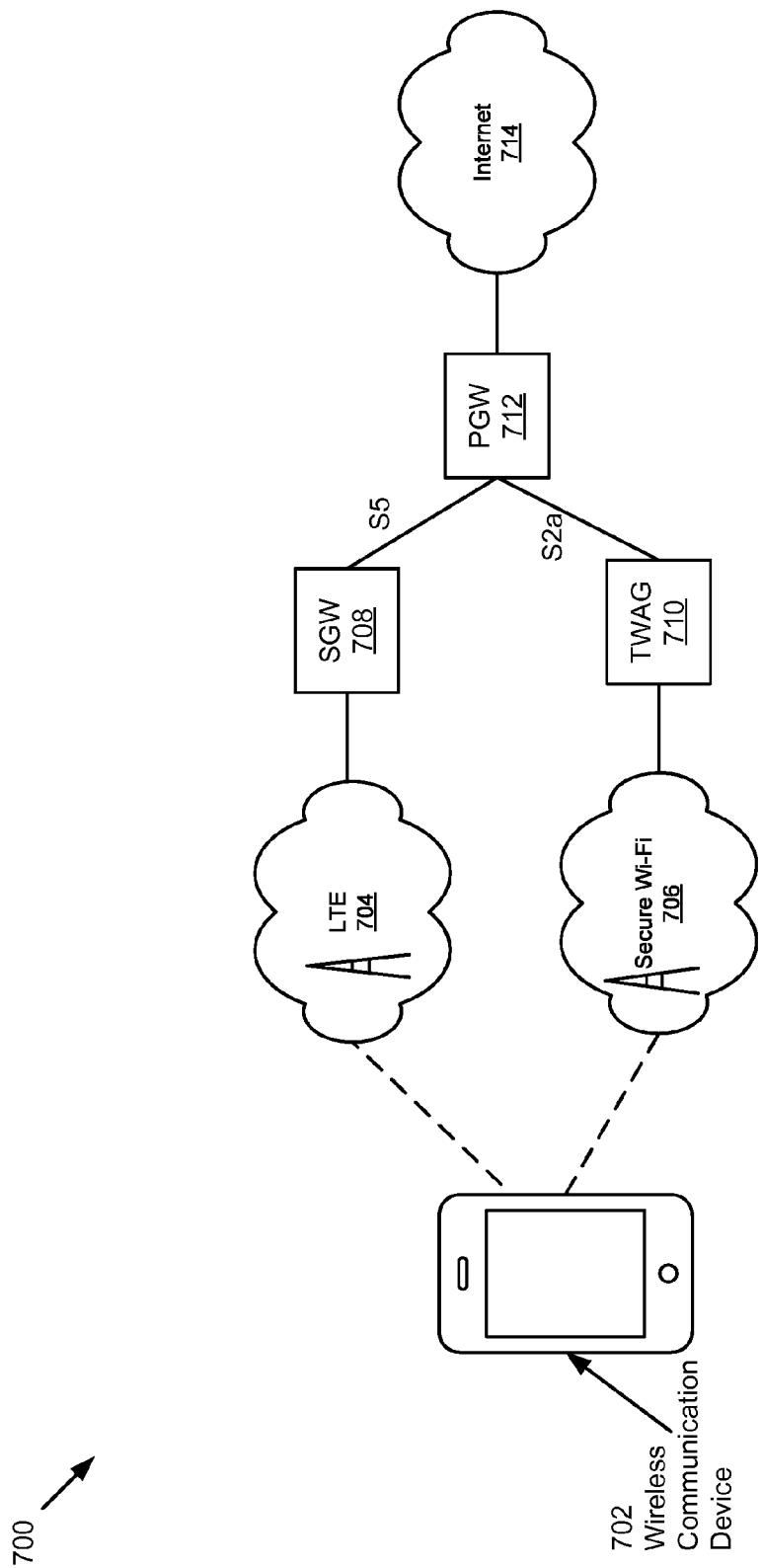
FIG. 7 illustrates an architecture of a wireless communication system in accordance with some example embodiments.

FIG. 7 illustrates an architecture of a wireless communication system 700 in accordance with some example embodiments. In the example of FIG. 7, the wireless communication device 702 can be an embodiment of the wireless communication device 202. As such, apparatus 300 can be implemented on wireless communication device 702 in accordance with some example embodiments. The secure Wi-Fi network 706 can be a trusted network. The Wi-Fi access point/trusted WLAN access gateway (TWAG) 710 can use a GTP (S2a) interface to connect to the PGW 712. However, present 3GPP specifications do not define a signaling mechanism from the network to a wireless communication device to indicate if the network is capable of supporting a network mobility protocol, such as S2a Mobility based on GTP (SaMOG), so the wireless communication device may not be able to offload applications, such as walled garden applications, from a cellular network to a WLAN.

The wireless communication device 702 in accordance with some example embodiments can be configured to proactively determine it is connected to a SaMOG network and/or other network supporting network mobility of a data session between radio access networks. For example, in some example embodiments, the wireless communication device 702 can be configured to perform a reverse domain name service (DNS) lookup of an IP address on the secure Wi-Fi network 706 to identify who has assigned the Wi-Fi address. If the IP address has been assigned by an operator of the cellular network (e.g., the operator of the LTE network 704), the wireless communication device 702 can assume that it is on a trusted network that supports SaMOG and/or other suitable network mobility protocol. The wireless communication device 702 can additionally or alternatively be configured to compare the IP address assigned on the secure Wi-Fi network 706 with that assigned on the LTE network 704. If both IP addresses belong to the same address pool or are identical, the wireless communication device 702 can be configured to assume that it is on a trusted network that supports SaMOG and/or other suitable network mobility protocol.

The wireless communication device 702 can additionally or alternatively be configured to attempt to connect to a known server on the cellular network via the secure Wi-Fi network 706. If the attempt is successful, the wireless communication device 702 can be configured to assume that it is on a trusted network that supports SaMOG and/or other suitable network mobility protocol. If, however, the attempt is not successful, the wireless communication device 702 can be configured to infer that it is not connected to a secure Wi-Fi network and can determine that seamless mobility between radio access networks should not be performed for a data session. In such instances, the wireless communication device 702 can accordingly fallback to usage of cellular (e.g., the LTE network 704) rather than handing over the data session to the secure Wi-Fi network 706. Accordingly, packets for the data session can be routed to the physical cellular interface rather than to the physical WLAN interface of the wireless communication device 702.

Figure 8:
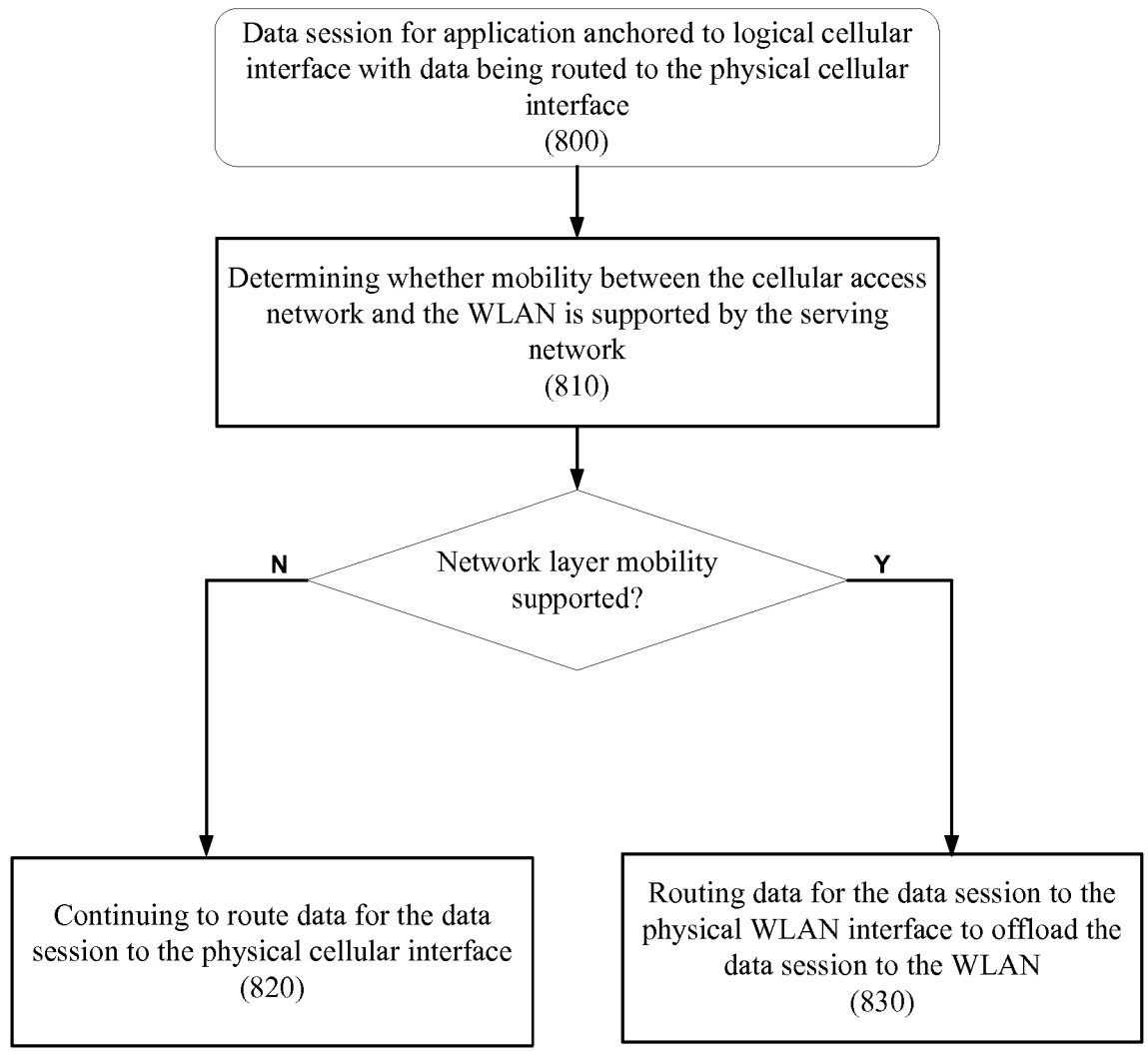
FIG. 8 illustrates a flowchart of an example method for determining whether to implement session mobility functionality based at least in part on whether network layer session mobility between a cellular access network and a WLAN is supported by the serving network in accordance with some example embodiments.

FIG. 8 illustrates a flowchart of an example method for determining whether to implement session mobility functionality based at least in part on whether network layer session mobility between a cellular access network and a WLAN is supported by the serving network in accordance with some example embodiments. In this regard, FIG. 8 illustrates an example method that can be performed by the wireless communication device 702. One or more of processing circuitry 310, processor 312, memory 314, first RAT interface 316, second RAT interface 318, or iRAT manager 320 can, for example, provide means for performing the operations illustrated in and described with respect to FIG. 8.

As illustrated in operation 800, a wireless communication device, such as wireless communication device 702, can have a data session for an application anchored to a logical cellular interface. Data for the data session can be routed to the physical cellular interface for transmission over a cellular access network, such as the LTE network 704.

Operation 810 can include the wireless communication device determining whether mobility between the cellular access network and a WLAN, such as the secure Wi-Fi network 706 is supported by the serving network. In this regard, operation 810 can include applying any of the techniques described above for determining whether the wireless communication device 702 is connected to a network supporting SaMOG and/or other suitable network mobility protocol. For example, operation 810 can include performing a reverse DNS lookup of an IP address of the device on the secure Wi-Fi network 706 to determine whether the cellular network operator has assigned the Wi-Fi address. As a further example, operation 810 can additionally or alternatively include determining whether an IP address assigned to the device on the cellular access network and an IP address assigned to the device on the WLAN are identical or belong to the same address pool. As still a further example, operation 810 can additionally or alternatively include the wireless communication device attempting to connect to a known server on the cellular network via the WLAN.

In an instance in which it is determined that network layer mobility between the cellular access network and the WLAN is not supported by the serving network, the method can include operation 820, which can include the wireless communication device continuing to route data for the data session to the physical cellular interface. If, however, it is determined that network layer mobility between the cellular access network and the WLAN is supported by the serving network, the method can include operation 830, which can include routing data for the data session (e.g., data sent to the logical cellular interface by the application) to the physical WLAN interface to offload the data session to the WLAN. It will be appreciated that further factors, such as network conditions, policy specifications, and/or the other factors that can be considered for radio interface selection can also be applied in performance of operation 830.

While several example embodiments have been described with respect to session mobility on devices having two physical interfaces, it will be appreciated that the techniques disclosed herein can be applied mutatis mutandis to provide seamless session mobility on devices having three or more physical interfaces available for transmitting data. Further, it will be appreciated that embodiments disclosed herein can be applied for mobility between any RATs. Thus, where examples are described with respect to a cellular RAT and WLAN (e.g., on devices having a physical cellular interface and a physical WLAN interface), it will be appreciated that techniques described with respect to those examples can be applied mutatis mutandis for any respective RATs, including, for example, two different cellular RATs such that a data session can be handed over between any two physical interfaces in a manner that is seamless to the application layer within the scope of the disclosure.

The various aspects, embodiments, implementations or features of the described embodiments can be used separately or in any combination. Various aspects of the described embodiments can be implemented by software, hardware or a combination of hardware and software. The described embodiments can also be embodied as a computer readable medium (or mediums) storing computer readable code including instructions that can be performed by one or more computing devices. The computer readable medium may be associated with any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code may be stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for seamless session mobility on a wireless communication device comprising a physical cellular interface and a physical wireless local area network (WLAN) interface, the method comprising the wireless communication device:
   anchoring a data session for an application to a logical cellular interface associated with the physical cellular interface, wherein the wireless communication device comprises a logical application layer in which the application is implemented and a logical physical layer comprising the physical cellular interface and the physical WLAN interface; and
   routing data for the data session sent to the logical cellular interface by the application to the physical WLAN interface for transmission via the physical WLAN interface in an instance in which the wireless communication device has an active connection to a WLAN, wherein routing data for the data session to the physical WLAN interface is performed under control of an inter-radio access technology (iRAT) manager implemented in a logical layer disposed in a lower layer than the logical application layer; and
   wherein use of the physical WLAN interface to transmit the data for the data session is transparent to the application.

2. The method of claim 1, wherein the logical layer is disposed above the logical physical layer.

3. The method of claim 1, further comprising the wireless communication device, prior to routing data for the data session to the physical WLAN interface:
   transmitting the data for the data session sent to the logical cellular interface by the application over a cellular access network via the physical cellular interface; and
   determining to handover the data session from the physical cellular interface to the physical WLAN interface;
   wherein determining to handover the data session is transparent to the application; and
   wherein routing data for the data session to the physical WLAN interface is performed in response to determining to handover the data session from the physical cellular interface to the physical WLAN interface.

4. The method of claim 3, further comprising the wireless communication device;
   entering a coverage area of the WLAN while connected to a heterogeneous network configured to support network based mobility via the cellular access network; and
   establishing the connection to the WLAN;
   wherein determining to handover the data session is performed in response to establishing the connection to the WLAN.

5. The method of claim 1, further comprising the wireless communication device:
   determining to route data for the data session to the physical WLAN interface based at least in part on an observed network condition for one or more of a cellular access network or the WLAN.

6. The method of claim 1, further comprising the wireless communication device:
   determining to route data for the data session to the physical WLAN interface based at least in part on a defined policy for physical interface selection.

7. The method of claim 1, further comprising anchoring the data session for the application to the logical cellular interface regardless of whether the wireless communication device has an active cellular network connection via the physical cellular interface.

8. The method of claim 1, wherein the application has a defined requirement to anchor any data sessions for the application to the logical cellular interface.

9. The method of claim 1, wherein the data session is a real time data session and the iRAT manager allows the data session to be moved between the physical cellular interface and the physical WLAN interface without dropping the real time data session.

10. The method of claim 1, further comprising the wireless communication device, prior to routing data for the data session to the physical WLAN interface:
    transmitting the data for the data session sent to the logical cellular interface by the application over a cellular access network via the physical cellular interface;
    determining whether a serving network supports session mobility between the cellular access network and the WLAN; and
    determining to handover the data session from the physical cellular interface to the physical WLAN interface only in an instance in which it is determined that the serving network supports session mobility between the cellular access network and the WLAN;

wherein routing data for the data session to the physical WLAN interface is performed only in an instance in which it is determined to handover the data session from the physical cellular interface to the physical WLAN interface.

11. The method of claim 1, wherein the wireless communication device is assigned a common Internet Protocol (IP) address for usage on both the physical cellular interface and the physical WLAN interface.

12. The method of claim 1, wherein network-based mobility of the data session between a cellular access network and the WLAN is supported by usage of one or more of Proxy Mobile Internet Protocol (PMIP) or General Packet Radio Service Tunneling Protocol (GTP).

13. A wireless communication device comprising:

a first physical interface configured to support communication via a first radio access technology (RAT), wherein the first physical interface is associated with a first logical interface;

a second physical interface configured to support communication via a second RAT, wherein the second physical interface is associated with a second logical interface; and processing circuitry communicatively coupled with the first physical interface and the second physical interface, wherein the processing circuitry is configured to cause the wireless communication device to at least:

anchor a data session for an application to the first logical interface, wherein the wireless communication device comprises a logical application layer in which the application is implemented and a logical physical layer comprising the first physical interface and the second physical interface; and route data for the data session sent to the first logical interface by the application to the second physical interface for transmission via the second physical interface in an instance in which the wireless communication device has an active connection to a radio access network implementing the second RAT, wherein routing data for the data session to the second physical interface is performed under control of an inter-radio access technology (iRAT) manager implemented in a logical layer disposed in a lower layer than the logical application layer.

14. The wireless communication device of claim 13, wherein the application is not exposed to the second logical interface, and wherein use of the second physical interface to transmit the data for the data session is transparent to the application.

15. The wireless communication device of claim 13, wherein the logical layer is disposed above the logical physical layer.

16. The wireless communication device of claim 13, wherein the processing circuitry is further configured to cause the wireless communication device to:

connect to a heterogeneous network via a radio access network implementing the first RAT, wherein the heterogeneous network is configured to support network based mobility;

transmit the data for the data session sent to the first logical interface by the application over the radio access network implementing the first RAT via the first physical interface;

establish the connection to the radio access network implementing the second RAT;

determine to handover the data session from the first physical interface to the second physical interface; and route data for the data session sent to the first logical interface by the application to the second physical interface in response to determining to handover the data session.

17. The wireless communication device of claim 13, wherein the processing circuitry is further configured to cause the wireless communication device to determine to route data for the data session to the second physical interface based at least in part on one or more of (i) an observed network condition for one or more of a radio access network implementing the first RAT or the radio access network implementing the second RAT; or (ii) a defined policy for physical interface selection.

18. The wireless communication device of claim 13, wherein the application has a defined requirement to anchor any data sessions for the application to the first logical interface.

19. The wireless communication device of claim 13, wherein the first physical interface is a physical cellular interface configured to support communication via a cellular RAT, and wherein the second physical interface is a physical WLAN interface configured to support communication via a WLAN RAT.

20. A non-transitory computer readable storage medium having computer program code stored thereon, the computer program code comprising program code, which, when executed by one or more processors implemented on a wireless communication device comprising a first physical interface and a second physical interface, is configured to cause the wireless communication device to perform a method comprising:

anchoring a data session for an application to a logical interface associated with the first physical interface, wherein the wireless communication device comprises a logical application layer in which the application is implemented and a logical physical layer comprising the first physical interface and the second physical interface; and routing data for the data session sent to the logical interface by the application to the second physical interface for transmission via the second physical interface, wherein routing data for the data session to the second physical interface is performed under control of an inter-radio access technology (iRAT) manager implemented in a logical layer disposed in a lower layer than the logical application layer.

* * * * *